Patented Dec. 26, 1944

2,365,728

UNITED STATES PATENT OFFICE 2,365,728

TREATMENT OF SAUSAGES AND SAUSAGE CASINGS

Gustav Redemske, Chicago, Ill., assignor to Armour and Company, Chicago, Ill., a corporation of Illinois No Drawing. Application May 9, 1940, Serial No. 334,270

10 Claims. (Cl. 99—109)

This invention relates to sausages and sausage casings and deals particularly with improved methods for preparing sausages with tender casings.

A general object of the invention is to provide an improved method of preparing sausages which after being cooked have tender casings.

Another object is to provide a method of preparing sausages in which no special handling or treatment is required after the sausage is stuffed, and which can conveniently be carried out in large scale meat packing operations.

A further object is to provide a method which will permit storage of the treated casings prior to their being used in sausage manufacture and which will permit the casings to be shipped and marketed in their treated form. The invention is directed also to the intermediate casing product which may be used in sausage manufacture, and also to the sausage product provided by the improved method.

Other objects will be apparent after the detailed description herein given.

In my improved method the cleaned casings, which may be taken from the intestines of animals, are first subjected to a conditioning procedure in which they are treated with proteolytic enzymes. In carrying out this procedure I conveniently immerse the casings in a solution containing a small amount of proteolytic enzymes, so that the casings are acted upon by the enzymes but are not digested or rendered weak. This pretreatment is thus not a tenderizing treatment in itself since it has substantially no effect on the tensile strength of the casings but is rather a conditioning step which will enable tenderizing at a later time.

Though any of the proteolytic enzymes such as trypsin, pepsin, bromelin, papain and ficin may be used in the improved process, I prefer to use enzymes of animal origin such as trypsin, pepsin or pancreatin. Pancreatin contains trypsin and is the mixed enzyme obtained from animal pancreas glands. The action of animal enzymes appears to be superior to the vegetable enzymes in my process from the standpoint of control and ease of handling as well as the final results obtained. Of the animal enzymes I find that trypsin works especially well in the improved process. I find that satisfactory results can be obtained if 0.22 pound of commercial trypsin powder having a proteolytic strength of 1:70 U. S. P. is used to 100 pounds of water, the temperature maintained at about 104° F. and the treatment extended about one hour. This same solution can be used for conditioning about 3,000 to 7,000 yards of hog casings.

The quantity of enzyme, type of enzyme, proteolytic strength of the enzyme, the temperature, and the time of treatment are all factors which may be varied greatly by adjustment of the other factors. In general, either a decrease in the proteolytic strength of the enzyme, or the use of a type of enzyme not as active at the temperature employed, or a decreased time of treatment will, other factors remaining the same, require an increased amount of the enzyme material to be used; and either an increase of the proteolytic strength of the enzyme, or the use of a temperature at which the type of enzyme employed is more active, or an increased time of treatment will, other factors remaining the same, require less enzyme material to be used. These factors should be so adjusted as to properly condition the casing for tenderizing upon subjection to heat at a later time, but so as not to result in a weakened casing by reason of this conditioning treatment alone.

The solution should have a temperature at which the particular enzyme used is active. In the case of pancreatin a preferred temperature range is from 100° F. to 110° F. although the process can be practiced at temperatures outside this range. In no case should the temperature of the bath be above about 140° F. since temperatures substantially above this will tender the casing at the conditioning step and so prohibit subsequent stuffing.

As before stated, the time of the conditioning treatment may be about an hour, but this can be varied especially where other factors are changed. However, the time should not be extended to the point that under the conditions of the process the casing is substantially weakened through enzymic action at this conditioning stage of the process.

After being removed from the enzyme solution the casings may be stuffed immediately with meats of any desired kind, and in such stuffing operations the casings are easily handled and present no difficulties not encountered in the stuffing of unconditioned casings. When the sausages are heated in cooking this serves the double function of cooking the meat and effecting substantial breakdown of the casings to tenderize them. I find that the conditioned casings can be satisfactorily tenderized if the heating step is carried to about 145° F. or higher, and where cooking of the sausage takes place the temperature is of course above that required for effecting the necessary casing breakdown. The casing breakdown or tenderizing effect here accomplished must not be confused with the effect of heat alone on the sausage casings. The tenderizing effect which I obtain by the improved process is dependent entirely on the prior conditioning step employing enzymic action.

Instead of immediately stuffing the treated casing as previously described I can pack the treated casing in salt and hold them in storage for any period desired in commercial practice. The salt apparently restricts or inhibits further enzyme action during the storage period. The salted casings may be withdrawn from storage at any desired time and then stuffed with meat. When so withdrawn it will be found that the casings have the same tensile strength as the untreated casings, the salt having prevented discoloration or weakening otherwise caused upon holding after treatment in the enzyme bath.

By the improved process the casings may be given the conditioning enzyme treatment and packed at the central packing house plants, and then may be shipped to outlying plants where the stuffing of sausages is done. Also advantages in convenience of operation will be obvious to those skilled in sausage manufacture. The salt used in treating the casings according to this improved method is preferably sodium chloride and may be in dry form or in the form of a brine.

It will be understood that by using my improved process the sausages may be sold to meat dealers in uncooked form and that this product has during distribution and marketing a firm tough casing. It is only after cooking of the sausage that this casing becomes tenderized.

A specific example of carrying out my invention is given as follows:

*Example*

A treating solution is prepared by adding to 40 pounds of water 1¾ ounces of pancreatin powder having a proteolytic strength of 1:70 U. S. P. These ingredients are well mixed and there is added 3 per cent of common salt (1.2 pounds). This solution is heated to 104° F. and in it are placed 500 yards of small hog casings. The mass is held for about an hour at 104° F. with occasional stirring, after which the treated casings are removed. Another lot of 500 yards may then be added and treated in the same way.

The 500 yards of treated casings may then be stuffed immediately, or may be thoroughly salted and packed for storage or shipment in cans. The stored casings may be withdrawn at any later time and employed in the usual stuffing operations.

My improved processes are applicable to animal casings such as hog, beef and lamb casings, and also to artificial sausage casings made of proteinaceous materials such as animal tendons and the like.

The foregoing detailed description has been given for clearness of understanding only and no unnecessary limitations should be understood therefrom. It is obvious that various changes and modifications can be employed without departing from the spirit of the invention. While the description given deals primarily with a natular casing derived from animal intestines the improved processes are applicable to artificial casings of protein material.

The term "meat" as herein used is to be understood as meaning any material such as comminuted pork, beef, fish or other food material, which is commercially stuffed in sausage casings.

What I claim as new and desire to secure by Letters Patent is:

1. A method of preparing sausages comprising treating unstuffed animal casings with a small amount of a proteolytic enzyme, terminating the treatment before the enzyme has acted to affect the tensile strength of the casings, whereby said casings are conditioned for tenderizing but contain substantially all their original tensile strength, stuffing said treated casings with meat, and subjecting the stuffed casings to heat whereby said meat is cooked and said casing is tenderized with a substantial reduction in its tensile strength.

2. A method of preparing sausages comprising treating unstuffed animal casings with a small amount of trypsin, terminating the treatment before the trypsin has acted to affect the tensile strength of the casings, whereby said casings are conditioned for tenderizing but retain substantially all their original tensile strength, stuffing said treated casings with meat, and subjecting the stuffed casing to heat whereby said meat is cooked and said casing is tenderized with a substantial reduction in its tensile strength.

3. A method of preparing sausages comprising treating unstuffed animal casings with a small amount of proteolytic enzyme, terminating the treatment before the enzyme has acted to affect the tensile strength of the casings, whereby said casings are conditioned for tenderizing but retain substantially all their original tensile strength, treating said casings with salt to inhibit further action of said enzyme over a holding period, and after said holding period stuffing said treated casings with meat thereby producing a sausage having a strong casing but capable of being tenderized upon the cooking of the sausage.

4. A method of preparing animal casings for use in sausage manufacture comprising subjecting the casing to treatment with a bath containing a small amount of proteolytic enzyme, terminating said treatment before the enzyme has acted to affect the tensile strength of the casings, whereby said casings are affected by said enzyme but retain substantially all their original tensile strength, and storing said treated casings by packing in salt to inhibit continued enzyme action.

5. A food product comprising an animal intestine casing having in association with it a proteolytic enzyme but having the same strength as it has in the absence of said enzyme, and an uncooked food material within said casing, said enzyme being effective to reduce substantially the strength of said casing when the product is cooked.

6. A food product as defined in claim 5 wherein the proteolytic enzyme is an animal enzyme.

7. A food product as defined in claim 5 wherein the proteolytic enzyme is pancreatin.

8. A food product as defined in claim 5 wherein the proteolytic enzyme is trypsin.

9. A food product as defined in claim 5 wherein the animal intestine casing is a hog casing.

10. A process as set forth in claim 1 wherein the casings treated are hog casings.

GUSTAV REDEMSKE.